US008224532B2

(12) United States Patent
Schmitt et al.

(10) Patent No.: US 8,224,532 B2
(45) Date of Patent: Jul. 17, 2012

(54) VEHICLES INCLUDING MASTER CONTROL DEVICE FOR CONTROL OF POWER DOOR

(75) Inventors: Matthew Weyand Schmitt, Columbus, OH (US); Steven Ray Thiele, Marysville, OH (US); Kozo Kusumoto, Dublin, OH (US)

(73) Assignee: Honda Motor Company, Ltd., Tokyo (JP)

( * ) Notice: Subject to any disclaimer, the term of this patent is extended or adjusted under 35 U.S.C. 154(b) by 978 days.

(21) Appl. No.: 12/209,647

(22) Filed: Sep. 12, 2008

(65) Prior Publication Data

US 2010/0070143 A1 Mar. 18, 2010

(51) Int. Cl.
*G06F 17/00* (2006.01)

(52) U.S. Cl. .......................................... 701/49; 701/45

(58) Field of Classification Search .................... 701/36, 701/45, 49; 180/281, 286; 49/280, 360
See application file for complete search history.

(56) References Cited

U.S. PATENT DOCUMENTS

| | | | | | |
|---|---|---|---|---|---|
| 5,574,315 | A | | 11/1996 | Weber | |
| 5,667,259 | A | | 9/1997 | Torkowski | |
| 5,689,160 | A | * | 11/1997 | Shigematsu et al. | 318/281 |
| 5,896,768 | A | | 4/1999 | Cranick et al. | |
| 6,046,510 | A | * | 4/2000 | Kawanobe et al. | 307/10.1 |
| 6,075,460 | A | * | 6/2000 | Minissale et al. | 340/12.22 |
| 6,081,758 | A | | 6/2000 | Parvulescu | |
| 6,091,162 | A | * | 7/2000 | Williams et al. | 307/10.1 |
| 6,157,090 | A | | 12/2000 | Vogel et al. | |
| 6,580,243 | B2 | * | 6/2003 | Itami et al. | 318/452 |
| 6,650,025 | B2 | * | 11/2003 | Li | 307/10.1 |
| 6,922,622 | B2 | * | 7/2005 | Dulin et al. | 701/45 |
| 7,073,291 | B2 | * | 7/2006 | Kawanobe et al. | 49/26 |
| 7,210,731 | B2 | * | 5/2007 | Ichinose et al. | 296/155 |
| 2001/0041956 | A1 | * | 11/2001 | Wong et al. | 701/36 |
| 2002/0161501 | A1 | * | 10/2002 | Dulin et al. | 701/45 |
| 2003/0052538 | A1 | | 3/2003 | Lorenz et al. | |
| 2004/0189093 | A1 | | 9/2004 | Belmond | |
| 2005/0093305 | A1 | | 5/2005 | Jackson | |
| 2005/0216133 | A1 | | 9/2005 | MacDougall et al. | |
| 2006/0175868 | A1 | * | 8/2006 | Ichinose et al. | 296/155 |
| 2006/0181152 | A1 | | 8/2006 | Taurasi | |
| 2007/0107313 | A1 | * | 5/2007 | Suzuki et al. | 49/360 |

OTHER PUBLICATIONS

2007 Honda Odyssey Online Reference Owner's Manual. [retrieved on Dec. 17, 2008]. Retrieved from the Internet: <URL:www.ahm-ownerlink.com>. 454 pages. Copy attached hereto. See entire document. This manual and/or the vehicle described therein is known to have been in the public domain prior to Sep. 12, 2007.

* cited by examiner

*Primary Examiner* — Khoi Tran
*Assistant Examiner* — Jason Holloway
(74) *Attorney, Agent, or Firm* — Ulmer & Berne LLP

(57) ABSTRACT

A vehicular control system includes a master control device. The master control device is configured to facilitate selection by a driver of a vehicle from among multiple operational modes. In a first operational mode, the control system prevents a door control device from effecting operation of a power door actuator. In a second operational mode, the control system facilitates operation of a power door actuator in response to a door control signal. Vehicles including the control system are also provided.

22 Claims, 4 Drawing Sheets

VEHICLES INCLUDING MASTER CONTROL DEVICE FOR CONTROL OF POWER DOOR

TECHNICAL FIELD

Vehicles are provided with a master control device which can facilitate control, such as by a driver of the vehicle, of a power door of the vehicle.

BACKGROUND

A conventional vehicle includes a sliding passenger door. A first electromechanical actuators provided to facilitate opening and closing of the sliding passenger door. A first control device (e.g., a handle) is provided within the vehicle to facilitate operation of the first electromechanical actuator by a passenger within the vehicle, and thus to facilitate control of the sliding passenger door by the passenger. A second control device is located for use by the driver of the vehicle to selectively prohibit control of the first electromechanical actuator by the passenger.

The conventional vehicle also includes a passenger window. A second electromechanical actuator is provided to facilitate opening and closing of the passenger window. A third control device is provided within the vehicle to facilitate operation of the second electromechanical actuator by a passenger within the vehicle, and thus to facilitate control of the passenger window by the passenger. A fourth control device is located for use by the driver of the vehicle to selectively prohibit control of the electromechanical actuator by the passenger.

In one particular conventional example, with reference to FIG. 7, a control device 235 is provided within a control panel 250 which is attached to the dashboard of a conventional Honda® Odyssey® minivan. The control panel 250 is provided at a location upon the dashboard which is accessible to a driver of the minivan. In addition to the control device 235, the control panel 250 is shown to provide a sunroof control device 260, a foot pedal control device 262, and door control devices 264 and 266 which selectively facilitate a driver's control of power door actuators associated with rear sliding passenger doors of the van.

The control device 235 is shown to comprise a slide switch and is moveable between two positions, namely an "on" position (shown in FIG. 7) and an "off" position. A brightly colored (i.e., red) marking 245 is provided adjacent to the control device 235 such that, when, and only when, the control device 235 is in the on position, the marking 245 is uncovered so that a driver of the minivan can identify, upon quickly glancing at the control device 235, whether the control device 235 is in the on or off position.

When the control device 235 is in the on position, rear interior door handles can be used by passengers to effect operation of the power door actuators to open and close the rear sliding doors of the van. However, when the control device 235 is in the off position, movement of the rear interior door handles does not result in operation of the power door actuators associated with the rear sliding doors of the van. Regardless of whether the control device 235 is in the on position or the off position, the driver can use the door control devices 264 and 266 to facilitate operation of the power door actuators associated with the rear sliding doors of the van.

Each of the rear sliding doors of the conventional Honda® Odyssey® minivan also includes a mechanical toggle-type switch which is attached to the edge of the rear sliding door. The switch can be manually adjusted in order to enable, or alternatively disable, use by a passenger of that door's interior handle to facilitate manual or powered (i.e., involving one of the power door actuators) opening of the rear sliding door by the passenger.

The conventional Honda® Odyssey® minivan also includes rear windows provided in the sliding doors and which are associated with power window actuators. Those power window actuators are selectively controllable by window control devices which are attached to the rear sliding doors. A switch attached to the driver's door enables the driver to selectively prevent the window control devices, and thus the rear-seated passengers, from opening and closing the rear windows.

SUMMARY

In accordance with one embodiment, a vehicle comprises a body structure, a door assembly, a window assembly, and a control system. The body structure defines a passenger compartment and an access opening. The door assembly is associated with the body structure. The door assembly comprises a door and a power door actuator. The door is movably coupled with the body structure. The door is moveable between an opened position in which the door facilitates passage of a passenger through the access opening and a closed position in which the door prevents passage of a passenger through the access opening. The power door actuator is coupled with the door and is configured to move the door between the opened position and the closed position in response to a door control signal. The window assembly is associated with the body structure and comprises a window and a power window actuator. The window is movable with respect to the body structure between an opened position and a closed position. The power window actuator is coupled with the window and reconfigured to move the window between the opened position and the closed position in response to a window control signal. The control system comprises a door control device, a window control device, and a master control device. The door control device is configured for use by a passenger within the passenger compartment to generate the door control signal. The window control device is configured for use by a passenger within the passenger compartment to generate the window control signal. The master control device is in communication with the power door actuator, the power window actuator, the door control device, and the window control device. The master control device is configured to facilitate selection by a driver from among multiple operation modes. The multiple operational modes comprise a first operational mode and a second operational mode. In the first operational mode, the control system is configured to prevent the door control device from effecting operation of the power door actuator, and prevent the window control device from effecting operation of the power window actuator. In the second operational mode, the control system is configured to facilitate operation of the power door actuator in response to the door control signal, and facilitate operation of the power window actuator in response to the window control signal.

In accordance with another embodiment, a vehicle comprises a body structure, a door, a power door actuator, a window assembly, a power window actuator, and a control system. The door is movably coupled with the body structure. The power door actuator is coupled with the door. The window assembly is associated with the body structure. The power window actuator is coupled with the window. The control system comprises a door control device, a window control device, and a master control device. The master control device is in communication with the power door actuator, the power window actuator, the door control device, and the window control device. The master control device is configured to facilitate selection by a driver from among multiple operation modes. The multiple operational modes comprise a first operational mode and a second operational mode. In the first operational mode, the control system is configured to prevent the door control device from effecting operation of the power door actuator, and prevent the window control device from effecting operation of the power window actuator. In the second operational mode, the control system is configured to facilitate use of the door control device to effect operation of the power door actuator, and facilitate use of the window control device to effect operation of the power window actuator.

In accordance with yet another embodiment, a control system is provided for a vehicle. The control system comprises a door control device, a window control device, and a master control device. The door control device is configured for use by a passenger of a vehicle to generate a door control signal. The window control device is configured for use by a passenger of a vehicle to generate a window control signal. The master control device is in communication with the door control device and the window control device. The master control device is configured to facilitate selection by a driver of a vehicle from among multiple operation modes. The multiple operational modes comprise a first operational mode and a second operational mode. In the first operational mode, the control system is configured to prevent the door control device from effecting operation of a power door actuator, and prevent the window control device from effecting operation of a power window actuator. In the second operational mode, the control system is configured to facilitate operation of a power door actuator in response to the door control signal, and facilitate operation of a power window actuator in response to the window control signal.

In accordance with still another embodiment, a control system is provided for a vehicle. The control system comprises a master control device which is configured to facilitate selection by a driver of a vehicle from among multiple operation modes. The multiple operational modes comprise a first operational mode, a second operational mode, and a third operational mode. In the first operational mode, the control system is configured to prevent a door control device from effecting operation of a power door actuator. In the second operational mode, the control system is configured to facilitate operation of a power door actuator in response to a door control signal. In the third operational mode, the control system is configured to prevent operation of a power door actuator and is also configured to control a handle actuator to prevent operation of a handle to open a door.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
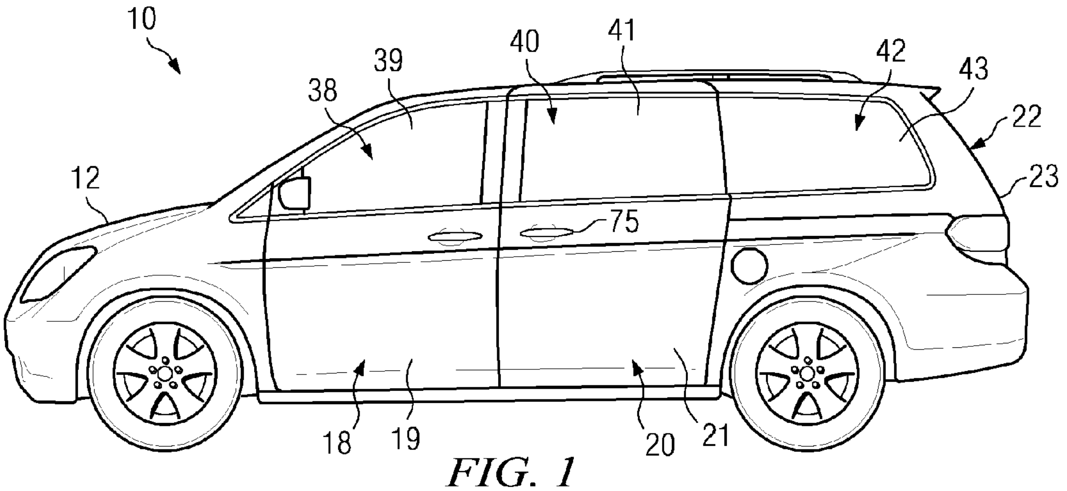
FIG. 1 is a left side elevational view depicting a van in accordance with one embodiment.

Embodiments are hereinafter described in detail in connection with the views of FIGS. 1-3, 4A-4C, 5A-5C, and 6-7, wherein like numbers indicate the same or corresponding elements throughout the views. A vehicle can be provided with a master control device which can facilitate combined control, such as by a driver of the vehicle, of a power window and a power door of the vehicle. In one embodiment, the vehicle can comprise a van 10, such as of a type which is often referred to as a minivan, as shown in FIG. 1. However, in other embodiments, the vehicle can comprise an automobile, a truck, a bus, and/or any of a variety of other types of vans or other vehicles which include both a door assembly and a window assembly, such as described in further detail below.

The van 10 is shown in FIG. 1 to comprise multiple door assemblies and multiple window assemblies. For example, as shown in FIG. 1, the van 10 comprises a front door assembly 18, a front window assembly 38, a rear door assembly 20, a rear window assembly 40, and a cargo area window assembly 42, all of which are illustrated to be provided upon the driver's side of the van. It will be appreciated that a similar arrangement of door assemblies and window assemblies can be provided upon the passenger's side (not shown) of the van 10. The van 10 can also comprise a cargo door assembly as indicated generally by reference number 22. It will be appreciated that other types of vans or other vehicles can have a different quantity and/or arrangement of door assemblies and window assemblies.

In the example of FIG. 1, each of the front door assembly 18, the rear door assembly 20, and the cargo door assembly 22 can be associated with a body structure 12 of the van 10. The body structure 12 can comprise frame members, body members, and/or other components that generally define the shell of the van 10. In one embodiment, the body structure 12 can comprise a unibody-type structure. In other embodiments, the body structure 12 can comprise multiple body panels welded to an underlying frame structure. The body structure 12 can define a passenger compartment (shown as 16 in FIG. 2) which is configured to support and hold people and cargo during use of the vehicle 10.

Figure 2:
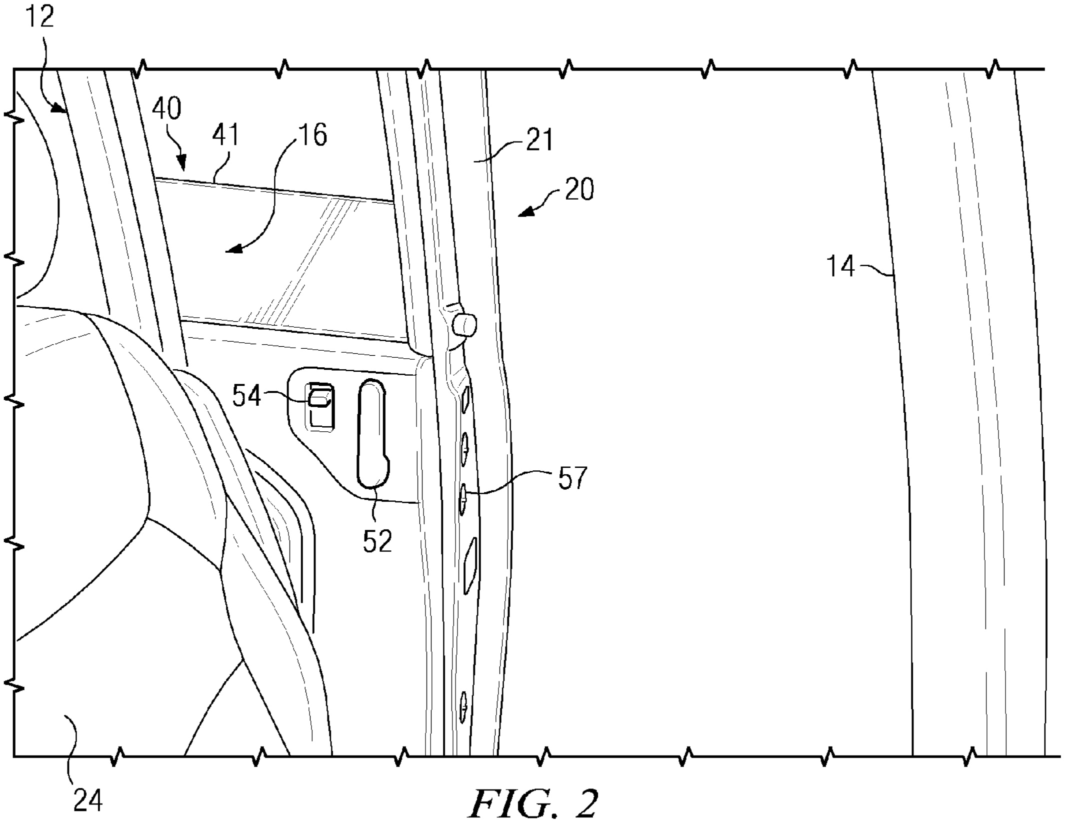
FIG. 2 is an enlarged right perspective view taken from inside a rear passenger compartment of the van of FIG. 1 with a rear sliding door in an opened position.
Figure 3:
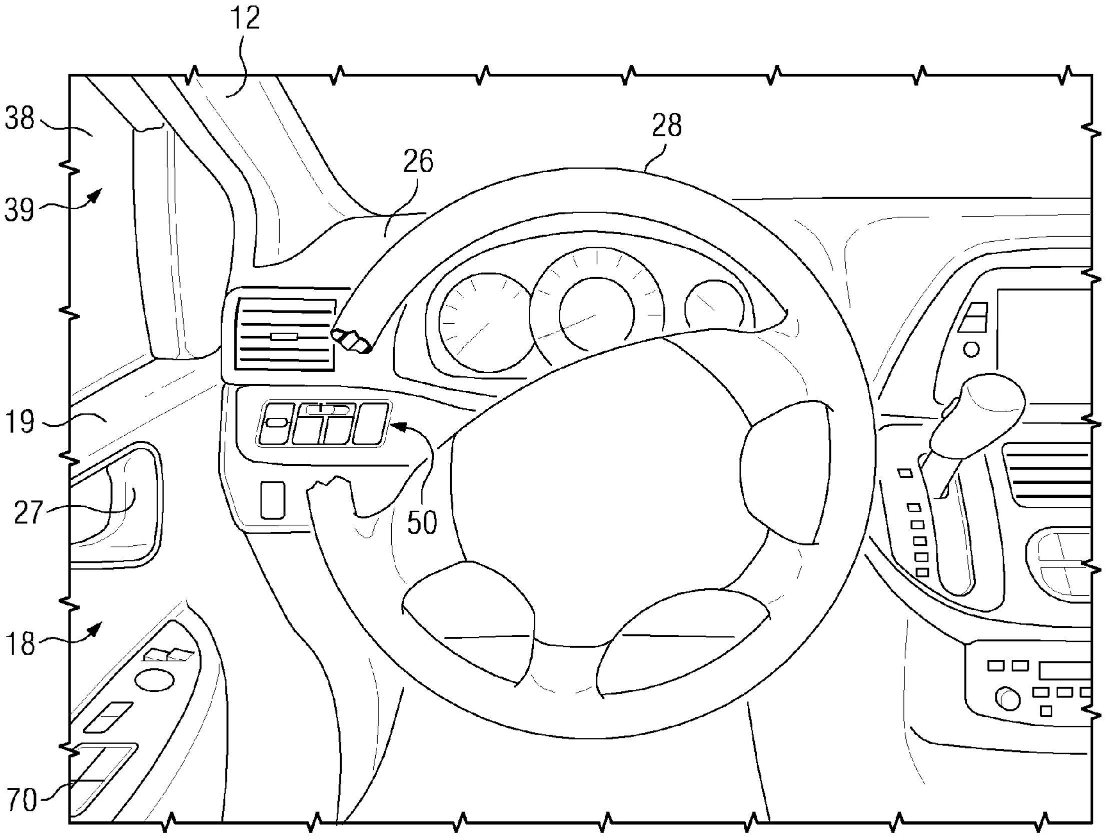
FIG. 3 is a perspective view taken from inside the van of FIG. 1 to reflect a vantage point of a driver of the van of certain interior components of the van, wherein a portion of the steering wheel has been broken away for clarity of illustration.

Each of the door assemblies of the van 10 can comprise a respective door. In particular, as shown in FIG. 1, the front, door assembly 18 is shown to comprise a door 19, the rear door assembly 20 is shown to comprise a door 21, and the cargo door assembly 22 can comprise a door as indicated generally by reference number 23. Each of the doors (e.g., 19, 21, 23) can be movably coupled with the body structure 12. The body structure 12 can define one or more access openings (e.g., 14 in FIG. 2) which is/are configured to be selectively blocked by one or more of the doors. In particular, each of the doors (e.g., 19, 21, 23) can be moveable between an opened position and a closed position. In the opened position, one or more of the doors can facilitate passage of a person (e.g., in the case of door 19, a driver of the van 10, and in the case of door 21, a passenger of the van 10) through an associated access opening (e.g., 14 for door 21, as shown in FIG. 2). In the closed position, such door(s) can prevent passage of a person through the access opening.

A door can be movably associated with a body structure of a vehicle in any of a variety of suitable arrangements. For example, with respect to the van 10 of FIG. 1, the door 19 can be hingedly connected to the body structure 12 such that the door 19 pivots about a vertical axis (not shown), as is common of driver's doors for many conventional vans. The door 21 can be slidably connected to the body structure 12 such that the door 21 comprises a sliding door which moves along a horizontal axis, as is common of rear doors for many conventional passenger-type vans. The door 23 can be hingedly connected to the body structure 12 such that the door 23 pivots about a horizontal axis (not shown), as is common of cargo doors for many conventional vans. It will be appreciated that the configuration, attachment, and selective movement of a door can vary depending upon the type of door, the type of associated vehicle, and the positioning of the door upon the vehicle.

As shown in the example of FIG. 1, the front window assembly 38, the rear window assembly 40, and the cargo area window assembly 42 can be associated with the body structure 12. In one embodiment, one or more of the window assemblies can be supported by a door. For example, with reference to FIG. 1, the front window assembly 38 can be supported by the front door assembly 18, and the rear window assembly 40 can be supported by the rear door 20. A window assembly (not shown) might also be supported by the cargo door 23.

Each of the window assemblies of the van 10 can comprise at least one respective window. In particular, with reference to FIG. 1, the front window assembly 38 is shown to comprise a window 39, the rear window assembly 40 is shown to comprise a window 41, and the cargo area window assembly 42 is shown to comprise a window 43. It will be appreciated that, in one embodiment, each of the windows 39, 41, and 43 can be movable with respect to the body structure 12 and between an opened position (e.g., shown in FIG. 2 for window 41) and a closed position (e.g., shown in FIG. 1 for window 41). In particular, windows 39 and 41 can be of a type which open and close by sliding down and up, respectively, while window 43 can be of a type which opens and closes by pivoting outwardly and inwardly, respectively. It will be appreciated that a window of a window assembly can move in any of a variety of other suitable manners to facilitate its opening and closing with respect to a body structure. It will also be appreciated that a window assembly can cooperate with a door structure in selectively blocking an access opening to a passenger compartment of a vehicle.

A door assembly can also include a power door actuator. The power door actuator can be coupled with an associated door of the door assembly and can be configured to selectively move the door between opened and closed positions in response to a door control signal as described below. For example, with reference to FIGS. 1 and 6, the rear door assembly 20 can include a power door actuator 32 which is configured to selectively move the door 21 between opened and closed positions with respect to the access opening 14 in the body structure 12. The power door actuator 32 can be coupled with both of the door 21 and the body structure 12, and can be located in the door 21, for example, or in any of a variety of other suitable locations or configurations, as will be appreciated. The power door actuator 32 can comprise one or more electric motors, hydraulic components, pneumatic components, and/or any of a variety of other components or arrangements thereof. In the arrangement of FIG. 1, it will be appreciated that the power door actuator 32 can comprise an electric motor which is attached to a sliding track system which, in turn, can be attached to each of the door 21 and the body structure 12. The power door actuator 32 can be configured to cause sliding of the door 21 between opened and closed positions. However, it will be appreciated that a power door actuator can be provided in any of a variety of alternative arrangements to facilitate movement of an associated vehicular door.

A door assembly can also include a handle and a handle actuator. For example, the door assembly 20 can include a handle 52 as shown in FIG. 2, and a handle actuator 56 as shown schematically in FIG. 6. The handle 52 is shown in FIG. 2 to be coupled with the door 21 and can be configured to selectively facilitate opening of the door 21 by a passenger within the passenger compartment 16 of the van 10. In one embodiment, the handle 52 can be associated with a door control device (shown schematically as 31 in FIG. 6) such that movement of the handle 52 causes the door control device 31 to generate a door control signal. In one embodiment, the door control device 31 can comprise an electrical switch that is located within the door 21 and is operable coupled with the handle 52 such that use of the handle 52 by a passenger results in actuation of the electrical switch, and resultant generation of the door control signal. In response to the generation of the door control signal, the power door actuator 32 can facilitate opening and closing of the door 21. The door assembly can also include a locking mechanism (e.g., including an interior lock lever 54 shown in FIG. 2) which can selectively prevent opening of the door assembly by an exterior handle (e.g., 75 in FIG. 1) of the door assembly.

In one embodiment, the handle 52 can also be configured such that, in certain circumstances in which the power door actuator 32 is inoperable, use of the handle 52 can facilitate manual opening of the door 21 by a passenger of the van 10. In such an embodiment, the handle actuator 56 can be configured to selectively prevent use of the handle 52 by a passenger of the van 10 to manually open the door 21. When the handle actuator 56 is set to prevent manual opening of the door 21, and the power door actuator 32 is disabled, it will be appreciated that a passenger within the passenger compartment 16 of the van 10 can be unable to open the door 21. In one embodiment, the handle actuator 56 can comprise a mechanical toggle-type switch 57 which is attached to the door 21, such as shown in FIG. 2, for example. The switch 57 can be manually adjusted in order to enable, or alternatively disable, use of the handle 52 by a passenger to facilitate manual opening of the door 21, and thus selectively prevent operation of the handle 52 to open the door 21.

In addition or alternative to the switch 57, the handle actuator 56 can comprise an electromechanical or other actuator, such as can be mounted to the door 21, and which can be electrically controlled (e.g., by a master control device as discussed below) to enable, or alternatively disable, use of the handle 52 by a passenger to facilitate manual opening of the door 21, and thus selectively prevent operation of the handle 52 to open the door 21.

A window assembly can include a power window actuator. The power window actuator can be coupled with an associated window of the window assembly and can be configured to selectively move the window between opened and closed positions in response to a window control signal as described below. For example, with reference to FIGS. 1 and 6, the rear window assembly 40 can include a power window actuator 34 which is configured to selectively move the window 41 between opened and closed positions. The power window actuator 34 can be coupled with both of the window 41 and the door 21, and can thus be indirectly coupled with the body structure 12. In one embodiment, the power window actuator 34 can be located in the door 21, but can alternatively be provided in any of a variety of other suitable configurations, as will be appreciated. The power window actuator 34 can comprise one or more electric motors, hydraulic components, pneumatic components, and/or any of a variety of other components or arrangements thereof. In one embodiment, it will be appreciated that the power window actuator 34 can comprise ah electric motor which is configured to cause sliding of the window 41 between opened and closed positions. However, it will be appreciated that a power window actuator can be provided in any of a variety of alternative arrangements to facilitate movement of an associated vehicular window.

Figure 6:
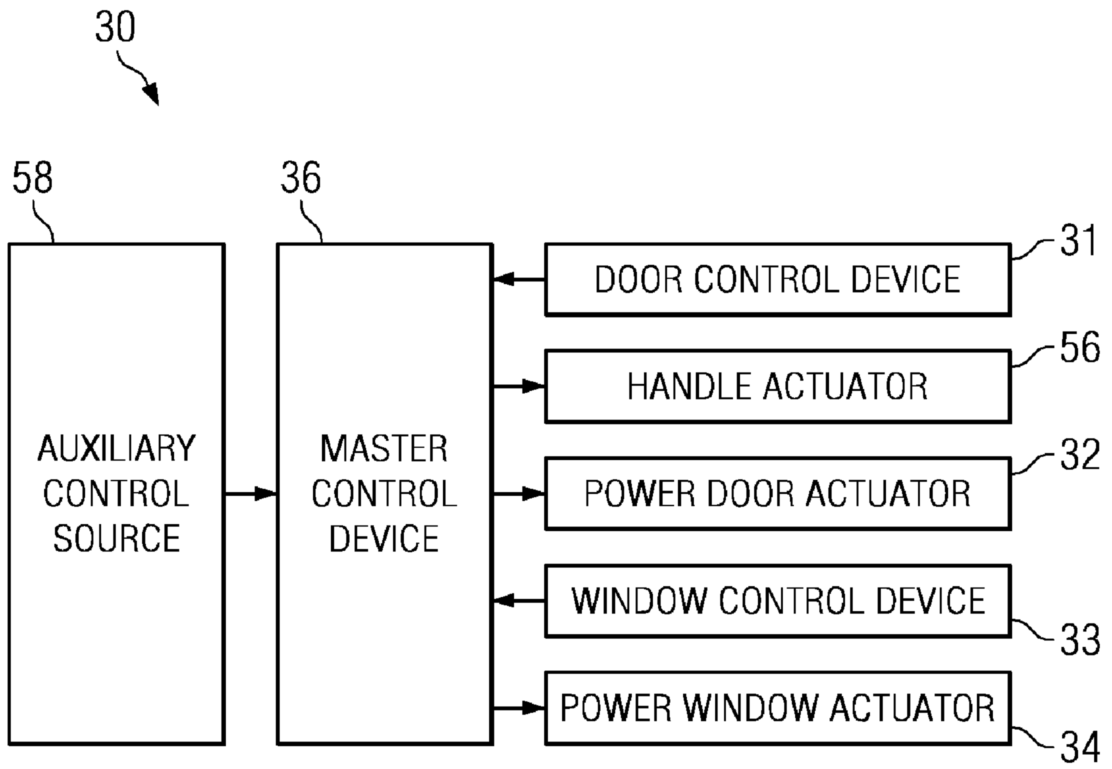
FIG. 6 is a functional block diagram depicting a control system for the van of FIG. 1 in accordance with one embodiment.
Figure 7:
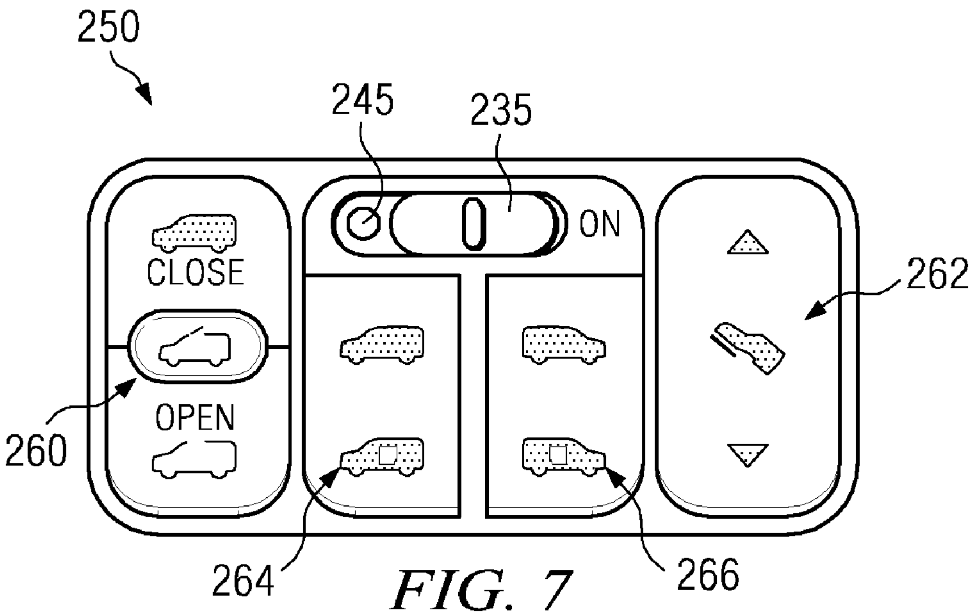
FIG. 7 (PRIOR ART)
FIG. 7 is an elevational view depicting a conventional control panel.

Referring to FIGS. 1 and 6, the van 10 can include a control system 30 which facilitates selective control of the door assembly 20 and the window assembly 40 by occupants of the van 10. The control system 30 can include the door control device 31 as described above and which is configured for use by a passenger within the passenger compartment 16 to generate the door control signal discussed above. The control system 30 can also include a window control device 33 which is configured for use by a passenger within the passenger compartment 16 to generate the window control signal discussed above. In one embodiment, the window control device 33 can be located within the passenger compartment 16 and at a position near the associated window assembly 40. The window control device 33 can be easily accessible by a passenger seated within the passenger compartment (e.g., on passenger scat 24 shown in FIG. 2) near the window assembly 40. In one embodiment, it will be appreciated that the window control device 33 can be attached to an interior body panel of the door 21. However, it will be appreciated that a window control device can be provided in any of a variety of other suitable locations within the passenger compartment of a vehicle. It will be appreciated that the control system 30 can include separate door control devices to facilitate selective passenger operation of each door assembly having a power door actuator and located adjacent to a seated passenger within the van 10, and separate window control devices to facilitate selective passenger operation of each window assembly having a power window actuator and located adjacent to a seated passenger within the van 10.

The control system 30 can also include an auxiliary control source 58, as shown in FIG. 6. In one embodiment, the auxiliary control source 58 can comprise one or more control devices attached to the dashboard, center console, front ceiling, or driver's door of the vehicle and configured for use by the driver of the vehicle to facilitate operation of power window actuators and power door actuators present within the vehicle, including those associated with windows and doors adjacent to passenger areas of the vehicle. For example, in one embodiment, with reference to FIGS. 4A, 4B, and 4C, the auxiliary control device 58 can include door control devices 64 and 66 which selectively facilitate a driver's control of power door actuators (e.g., 32) associated with rear passenger doors (e.g., door 21) of the van 10. In another embodiment, the auxiliary control source 58 can comprise a remote control device, such as might be suitable for attachment to or integration with a key or keychain, and such as can be configured for use to facilitate operation of power window actuators and power door actuators present within the vehicle, including those associated with windows and doors adjacent to passenger areas of the vehicle. In yet another embodiment, the auxiliary control source 58 can comprise an engine control unit or other control system present upon a vehicle and which is configured to provide control signals to facilitate operation of power window actuators and power door actuators present within the vehicle, including those associated with windows and doors adjacent to passenger areas of the vehicle.

Figure 4A:
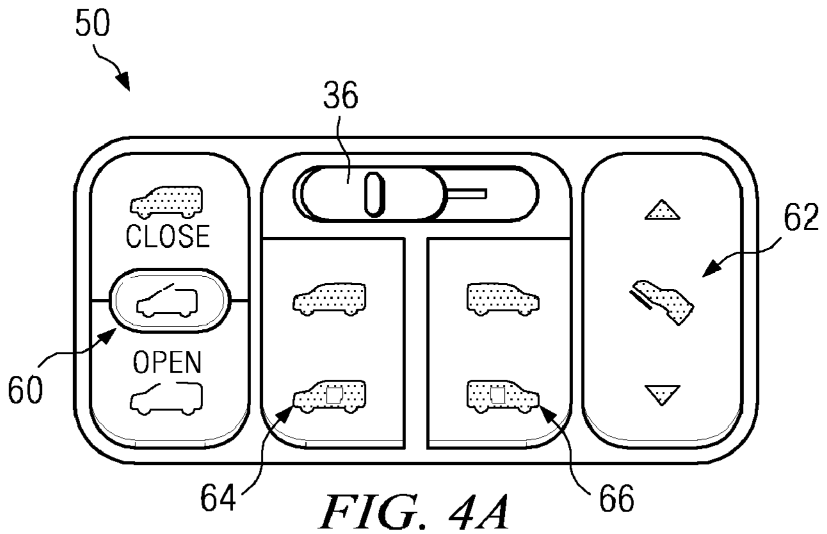
FIG. 4A is an enlarged elevational view depicting a control panel of FIG. 3 apart from the remaining components of FIG. 3, wherein a master control device is in a first position.
Figure 4B:
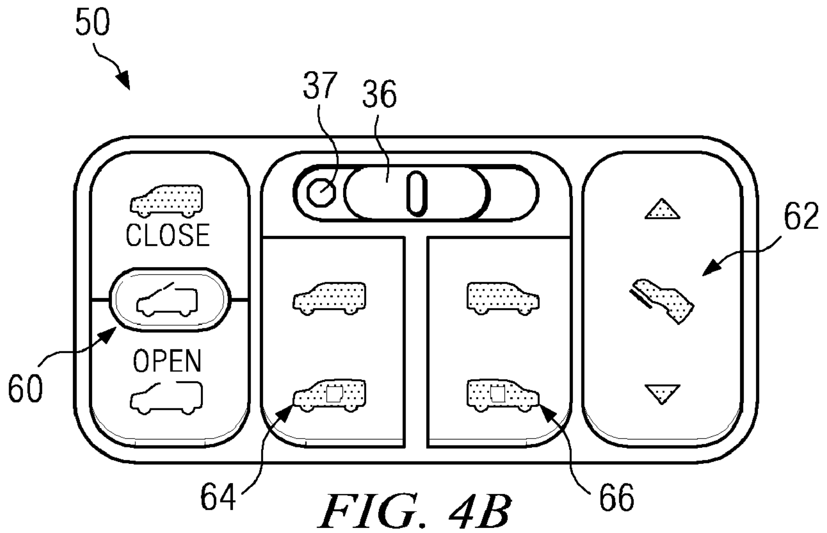
FIG. 4B is an elevational view depicting the control panel of FIG. 4A wherein the master control device is in a second position.
Figure 4C:
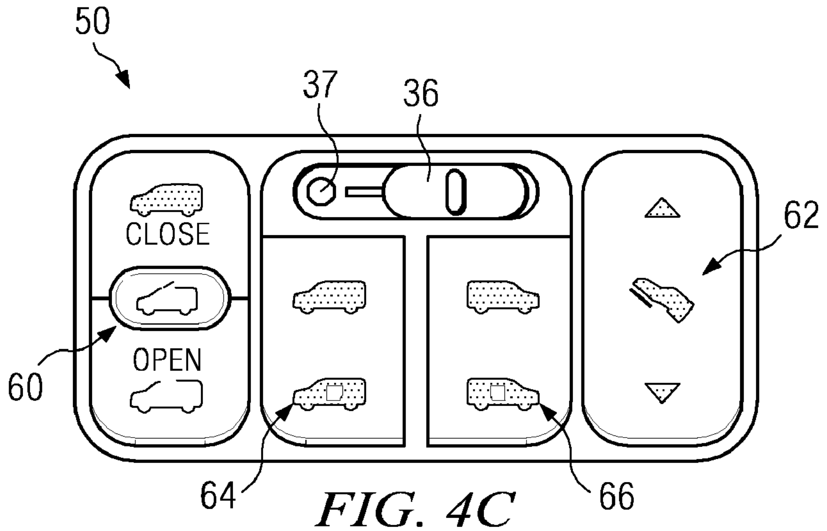
FIG. 4C is an elevational view depicting the control panel of FIGS. 4A-4B wherein the master control device is in a third position.

The control system 30 can also comprise a master control device 36, as shown in FIG. 6. The master control device 36 can be positioned within the van 10 such that it may be easily accessible by a driver of the van 10. In one embodiment, the master control device 36 can be attached to a dashboard 26 of the van 10. It will be appreciated that the dashboard 26 can be associated with the body structure 12 such as by attachment to the body structure 12 with fasteners. In one embodiment, with reference to FIGS. 2, 4A, 4B, and 4C, the master control device 36 can be provided within a control panel 50, and the control panel 50 can be attached to the dashboard 26. The master control device 36 and the control panel 50 are shown to be disposed at a location upon the dashboard 26 which is partially behind a steering wheel 28 of the van 10, though it will be appreciated that a master control device and/or associated control panel can be provided at any of a variety of other locations within a vehicle such as, for example, at another location upon a dashboard of a vehicle, upon a ceiling of a vehicle, oh an interior panel of a driver's door, or on a center console. In addition to the master control device 36, the control panel 50 is shown in FIGS. 4A, 4B, and 4C to provide a sunroof control device 60, a foot pedal control device 62, and door control devices 64 and 66 which selectively facilitate a driver's control of power door actuators (e.g., 32) associated with rear passenger doors (e.g., door 21) of the van 10. However, it will be appreciated that a control panel, in addition to including a master control device, can additionally or alternatively include any of a variety of other suitable control devices.

Figure 5A:
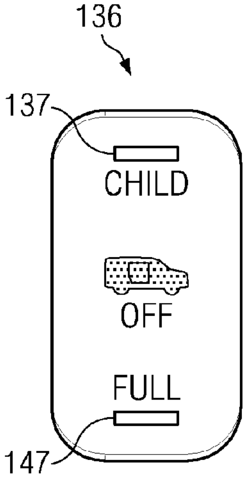
FIG. 5A is an elevational view depicting a master control device in accordance with another embodiment, wherein the master control device is in a first position.
Figure 5B:
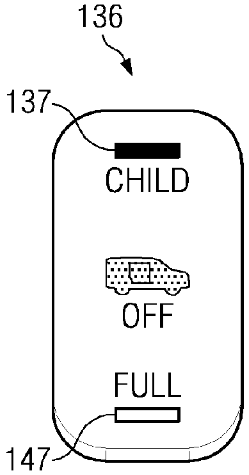
FIG. 5B is an elevational view depicting the master control device of FIG. 5A wherein the master control device is in a second position.
Figure 5C:
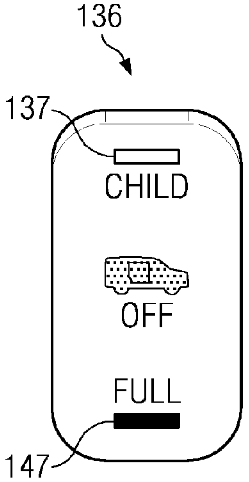
FIG. 5C is an elevational view depicting the master control device of FIGS. 5A-5B wherein the master control device is in a third position.

The master control device 36 is shown in FIGS. 4A, 4B, and 4C to comprise a slide switch. A master control device 136 can alternatively comprise a rocker switch as shown in FIGS. 5A, 5B, and 5C. It will be appreciated that a master control device can alternatively comprise any of a variety of other types of switches or control devices, or combinations thereof, which may include, for example, a toggle switch, a rotary switch, a pushbutton, a lever, or a push/pull switch. A master control device can facilitate selection by a driver from among multiple operational modes. It will be appreciated that, in certain embodiments, a master control device can be selectively movable by a driver between or among multiple positions, wherein each of those positions is associated with a respective one of a plurality of operational modes of a control system. For example, each of the master control devices 36, 136 is moveable among three respective positions (illustrated in FIGS. 4A, 4B, and 4C and FIGS. 5A, 5B, and 5C, respectively) to facilitate selection by a driver from among three respective operational modes, as discussed in further detail below. It will be appreciated that in an alternative embodiment, a master control device (e.g., a slide switch or rocker switch) might only be movable between two positions to facilitate selection by a driver from among two respective operational modes. In yet another alternative embodiment, a master control device (e.g., a slide switch or rocker switch) might be movable among more than three positions to facilitate selection by a driver from among a corresponding number of operational modes.

In one embodiment, the control system 30 can additionally include an indicator device. The indicator device can be configured to alert a driver as to the operational mode selected by the master control device. In one embodiment, the indicator device can comprise a light source such as one or more incandescent light bulbs or light emitting diodes ("LEDs"), for example. The light source can be disposed adjacent to the master control device as shown, for example, with respect to an indicator light 37 and the master control device 36 in FIGS. 4B and 4C, and also with respect to indicator lights 137 and 147 and the master control device 136 in FIGS. 5A, 5B, and 5C. However, in another embodiment, indicator light(s) can be provided remotely from the master control device. In still another embodiment, the indicator device can comprise a display which additionally provides other information to the driver of the vehicle (e.g., a customized display panel).

In one embodiment, one or more indicator lights (e.g., 37, 137, 147) might be configured to flash in certain circumstances. For example, when starting the vehicle, the indicator light 37 can flash to alert a driver of the vehicle as to which of the operational modes has been selected by the master control device. In another embodiment, the indicator light 37 can flash to alert a driver as to certain occurrences, such as when a passenger uses a window control device or a door control device during one or more of the operational modes (e.g., when the child operational mode, described below, is selected by the driver).

A master control device (e.g., 36 in FIG. 6) can be provided in communication with one or more power door actuators (e.g., 32 in FIG. 6), one or more power window actuators (e.g., 34 in FIG. 6), one or more door control devices (e.g., 31 in FIG. 6), one or more handle actuators (e.g., 56 in FIG. 6), one or more window control devices (e.g., 33 in FIG. 6), and one or more auxiliary control sources (e.g., 58 in FIG. 6, such as door control devices 64 and 66 in FIGS 4A, 4B, and 4C). The communication between the master control device and these other components can involve transmission of electrical signals and/or data, and can occur through use of wires or alternatively, wirelessly. It will also be appreciated that this communication can be achieved directly, or through some indirect path or intermediate component(s).

As previously indicated, a master control device (e.g., 36 in FIGS. 4A, 4B, 4C, and 6) can be configured to facilitate selection by a driver from among multiple operation modes. In one embodiment, the multiple operational modes can include a first operational mode, a second operational mode, and a third operational mode. When in a first position, shown in FIGS. 4B and 5B, the master control device 36, 136 can select a first or "child" operational mode. When in a second position, shown in FIGS. 4C and 5C, the master control device 36, 136 can select a second or "full" operational mode. When in a third position, shown in FIGS. 4A and 5A, the master control device 36, 136 can select a third or "of" operational mode. Although not shown in FIGS. 4A, 4B, and 4C, it will be appreciated that symbols or words can be provided upon or adjacent to the master control device 36 so that a driver can quickly identify, upon glancing at the master control device 36, whether the child full, or off operational mode has been selected by the master control device 36. As can be seen in FIGS. 5A, 5B, and 5C, the master control device 136 is provided with such symbols and words to facilitate such identification by a driver of a vehicle.

In the child operational mode, the control system 30 can be configured to prevent one of more door control devices (e.g., 31) from effecting operation of one or more power door actuators (e.g., 32). Additionally, in the child operational mode, the control system 30 can be configured to prevent one or more window control devices (e.g., 33) from effecting operation of one or more power window actuators (e.g., 34). Furthermore, in the child operational mode, the control system 30 can be configured to control one or more handle actuators (e.g., 56) to prevent operation of one or more handles (e.g., 27) to manually open an associated door (e.g., 21). Accordingly, when in the child operational mode, it will be appreciated that the control system 30 can thus facilitate a driver's control of passenger doors (e.g., 21) and windows (e.g., 41) of the van 10 (e.g., through use of the door control device 64 in and a window control device 70 shown in FIG. 2), while prohibiting a passenger's control of passenger doors (e.g., 21) and windows (e.g., 41) of the van 10 (e.g., through use of the handle 52 and the window control device 33 such as may be attached to an interior panel of the door 21).

In the full operational mode, the control system 30 can be configured to facilitate operation of the power door actuator (s) (e.g., 32) in response to door control signals from door control device(s) (e.g., 31). Additionally, in the full operational mode, the control system 30 can be configured to facilitate operation of the power window actuator(s) (e.g., 34) in response to window control signals from the window control device(s) (e.g., 33). Furthermore, in the full operational mode, the control system 30 can be configured to control one or more handle actuators (e.g., 56) to facilitate operation of one or more handles (e.g., 27) to manually open an associated door (e.g., 21). Accordingly, when in the full operational mode, it will be appreciated that the control system 30 can thus facilitate a driver's control of passenger doors (e.g., 21) and windows (e.g., 41) of the van 10 (e.g., through use of the door, control device 64 and the window control device 70) as well as a passenger's control of passenger doors (e.g., 21) and windows (e.g., 41) of the van 10 (e.g., through use of the handle 52 and the window control device 33).

In each of the child and full operation, modes, it will be appreciated that the driver can use the auxiliary control source 58 (e.g., the door control devices 64 and 66) to facilitate operation of the power door actuator(s) (e.g., 32) and the power window actuator(s) (e.g., 34). In the off operational mode, if so provided, operation of the auxiliary control source 58 to facilitate a driver's control of these functions can be disabled. In particular, in the off operational mode, the control system 30 can be configured to prevent all operation of the power door actuator(s) (e.g., 32), control the handle actuator (s) (e.g., 56) to prevent operation of the handle(s) (e.g., 52) to manually open the associated door(s) (e.g., 21), and prevent operation of the power window actuator(s) (e.g., 34). In another embodiment, in the off operational mode, the control system 30 can be configured to prevent all operation of the power door actuator(s) (e.g., 32) and power window actuator (s) (e.g., 34), but can control the handle actuator(s) (e.g., 56) to facilitate operation of the handle(s) (e.g., 52) to enable a passenger to manually open the associated door(s) (e.g., 21). In yet another embodiment, it will be appreciated that, in the off operational mode, certain auxiliary control sources (e.g., dashboard-mounted control devices such as door control devices 64 and 66) can be used by a driver to control power window and door actuators, while use of other auxiliary control devices (e.g., remote control key-fob type devices) can be disabled. In still other embodiments, it will be appreciated that a master control device might only be configured to select from between child and full operational modes, and thus an off operational mode might not be provided. It will be appreciated that the precise functions of the power door and window actuators and the handle control actuators of a vehicle can be provided in any of a variety of suitable alternative configurations.

It will be appreciated that a master control device (e.g., 36, 136) can enable a driver to simultaneously change a passenger's ability to control doors and windows of a vehicle. Such control can accordingly be accomplished quickly and efficiently by a driver of a vehicle, and without having to undertake multiple respective steps, and without having to require the driver to use multiple respective control devices. Such control can accordingly result in less confusion by a driver of a vehicle with regard to the door and window controls provided upon the vehicle, and will accordingly increase the likelihood that the driver will use the door and window controls frequently and effectively such as to protect children within the vehicle. It will also be appreciated that consolidating such functionality into a single master control device, an associated control system can facilitate use of fewer components (e.g., fewer control devices for the driver), and can accordingly result in more convenient and efficient manufacture of a vehicle, and resultant cost sayings and reduction in manufacturing time. While FIG. 2 and portions of the foregoing explanation indicate or imply the driver's seat or side being oriented upon a left side of a vehicle, it will be appreciated that a driver's seat or side can alternatively be oriented upon a right side a vehicle.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle comprising:

a body structure defining a passenger compartment and an access opening;

a door assembly associated with the body structure, the door assembly comprising:

a door movably coupled with the body structure, the door being moveable between an opened position in which the door facilitates passage of a passenger through the access opening and a closed position in which the door prevents passage of a passenger through the access opening;

a power door actuator coupled with the door and configured to move the door between the opened position and the closed position in response to a door control signal;

a handle coupled with the door and configured to selectively facilitate opening of the door by a passenger within the passenger compartment; and a handle actuator coupled with the handle and configured to selectively prevent operation of the handle to open the door;

a window assembly associated with the body structure, the window assembly comprising:

a window being movable with respect to the body structure between an opened position and a closed position; and a power window actuator coupled with the window and configured to move the window between the opened position and the closed position in response to a window control signal; and a control system comprising:

a door control device configured for use by a passenger within the passenger compartment to generate the door control signal;

a window control device configured for use by a passenger within the passenger compartment to generate the window control signal; and a master control device in communication with the power door actuator, the handle actuator, the power window actuator, the door control device, and the window control device, the master control device being configured to facilitate selection by a driver from among multiple operational modes, the multiple operational modes comprising a first operational mode and a second operational mode;

wherein, in the first operational mode, the control system is configured to simultaneously:

control the handle actuator to prevent operation of the handle to open the door;

prevent the door control device from effecting operation of the power door actuator; and prevent the window control device from effecting operation of the power window actuator; and wherein, in the second operational mode, the control system is configured to simultaneously:

control the handle actuator to facilitate operation of the handle to open the door;

facilitate operation of the power door actuator in response to the door control signal; and facilitate operation of the power window actuator in response to the window control signal.

2. The vehicle of claim 1 wherein:

the control system further comprises an auxiliary control source in communication with the master control device;

the multiple operational modes further comprises a third operational mode;

in each of the first and second operational modes, the auxiliary control source is configured to facilitate selective operation of at least one of the power door actuator and the power window actuator; and in the third operational mode, the control system is configured to:

prevent operation of the power door actuator;

control the handle actuator to prevent operation of the handle to open the door; and prevent operation of the power window actuator.

3. The vehicle of claim 2 comprising a van, wherein the door comprises a sliding door, and wherein the window assembly is supported by the sliding door.

4. The vehicle of claim 1 further comprising a dashboard associated with the body structure, wherein the master control device is attached to the dashboard.

5. The vehicle of claim 1 wherein the master control device comprises one of a rocker switch and a slide switch.

6. The vehicle of claim 1 wherein the control system further comprises an indicator device, the indicator device being configured to identify which of the first and second operational modes is selected by the master control device.

7. The vehicle of claim 6 wherein the indicator device comprises an indicator light disposed adjacent to the master control device.

8. The vehicle of claim 1 wherein:
the control system further comprises an auxiliary control source in communication with the master control device;
the multiple operational modes further comprises a third operational mode;
in each of the first and second operational modes, the auxiliary control source is configured to facilitate selective operation of at least one of the power door actuator and the power window actuator; and
in the third operational mode, the control system is configured to prevent operation of both the power door actuator and the power window actuator.

9. The vehicle of claim 1 comprising a van, wherein the door comprises a sliding door, and wherein the window assembly is supported by the sliding door.

10. A vehicle comprising:
a body structure;
a door movably coupled with the body structure;
a power door actuator coupled with the door; a handle coupled with the door and configured to selectively facilitate opening of the door by a passenger within a passenger compartment of the vehicle;
a handle actuator coupled with the handle and configured to selectively prevent operation of the handle to open the door;
a window assembly associated with the body structure;
a power window actuator coupled with the window; and
a control system comprising:
a door control device configured for use by a passenger;
a window control device configured for use by a passenger; and
a master control device in communication with the power door actuator, the handle actuator, the power window actuator, the door control device, and the window control device, the master control device being configured to facilitate selection by a driver from among multiple operational modes, the multiple operational modes comprising a first operational mode and a second operational mode;
wherein, in the first operational mode, the control system is configured to simultaneously:
control the handle actuator to prevent operation of the handle to open the door:
prevent the door control device from effecting operation of the power door actuator; and
prevent the window control device from effecting operation of the power window actuator; and
wherein, in the second operational mode, the control system is configured to simultaneously:
control the handle actuator to facilitate operation of the handle to open the door;
facilitate use of the door control device to effect operation of the power door actuator; and
facilitate use of the window control device to effect operation of the power window actuator.

11. The vehicle of claim 10 wherein:
the control system further comprises an auxiliary control source in communication with the master control device;
the multiple operational modes further comprises a third operational mode;
in each of the first and second operational modes, the auxiliary control source is configured to facilitate selective operation of at least one of the power door actuator and the power window actuator; and
in the third operational mode, the control system is configured to:
prevent operation of the power door actuator;
control the handle actuator to prevent operation of the handle to open the door; and
prevent operation of the power window actuator.

12. The vehicle of claim 11 comprising a van, wherein the door comprises a sliding door, and wherein the window assembly is supported by the sliding door.

13. The vehicle of claim 10 wherein the control system further comprises an indicator device, the indicator device being configured to identify which of the first and second operational modes is selected by the master control device.

14. The vehicle of claim 10 wherein:
the control system further comprises an auxiliary control source in communication with the master control device;
the multiple operational modes further comprises a third operational mode;
in each of the first and second operational modes, the auxiliary control source is configured to facilitate selective operation of at least one of the power door actuator and the power window actuator; and
in the third operational mode, the control system is configured to prevent operation of both the power door actuator and the power window actuator.

15. The vehicle of claim 10 comprising a van, wherein the door comprises a sliding door, and wherein the window assembly is supported by the sliding door.

16. A control system for a vehicle, the control system comprising:
a door control device configured for use by a passenger of a vehicle to generate a door control signal;
a window control device configured for use by a passenger of a vehicle to generate a window control signal; and
a master control device in communication with the door control device and the window control device, the master control device being configured to facilitate selection by a driver of a vehicle from among multiple operational modes, the multiple operational modes comprising a first operational mode and a second operational mode;
wherein, in the first operational mode, the control system is configured to simultaneously:
prevent operation of a door handle by controlling a handle actuator;
prevent the door control device from effecting operation of a power door actuator; and
prevent the window control device from effecting operation of a power window actuator; and
wherein, in the second operational mode, the control system is configured to simultaneously:
facilitate operation of a door handle by controlling a handle actuator;
facilitate operation of a power door actuator in response to the door control signal; and facilitate operation of a power window actuator in response to the window control signal.

17. The control system of claim 16 wherein the master control device comprises one of a rocker switch and a slide switch.

18. The control system of claim 16 wherein the control system further comprises an indicator device, the indicator device being configured to identify which of the first and second operational modes is selected by the master control device.

19. The control system of claim 18 wherein the indicator device comprises an indicator light disposed adjacent to the master control device.

20. The control system of claim 16 wherein the control system further comprises an auxiliary control source in communication with the master control device wherein, in each of the first and second operational modes, the auxiliary control source is configured to facilitate selective operation of at least one of a power door actuator and a power window actuator.

21. The control system of claim 20 wherein the multiple operational modes further comprises a third operational mode and wherein, in the third operational mode, the control system is configured to:

prevent operation of a power door actuator;

control a handle actuator to prevent operation of a handle to open a door; and prevent operation of a power window actuator.

22. A control system for a vehicle, the control system comprising:

a master control device being configured to facilitate selection by a driver of a vehicle from among multiple operational modes, the multiple operational modes comprising a first operational mode, a second operational mode, and a third operational mode;

wherein, in the first operational mode, the control system is configured to:

prevent a door control device from effecting operation of a power door actuator; wherein, in the second operational mode, the control system is configured to:

facilitate operation of a power door actuator in response to a door control signal; and wherein, in the third operational mode, the control system is configured to simultaneously:

prevent operation of a power door actuator; and prevent operation of a handle to open a door through control of a handle actuator.

* * * * *

UNITED STATES PATENT AND TRADEMARK OFFICE

CERTIFICATE OF CORRECTION

PATENT NO. : 8,224,532 B2
APPLICATION NO. : 12/209647
DATED : July 17, 2012
INVENTOR(S) : Matthew Weyand Schmitt et al.

It is certified that error appears in the above-identified patent and that said Letters Patent is hereby corrected as shown below:

Column 1, line 13, change “actuators” to --actuator is--;
Column 2, line 34, change “reconfigured” to --is configured--;
Column 5, line 5, change “front,” to --front--;
Column 7, line 28, change “ah” to --an--;
Column 7, line 48, change “scat” to --seat--;
Column 8, line 40, change “oh” to --on--;
Column 9, line 64, change “of” to --off--;
Column 10, line 8, change “of” to --or--;
Column 10, line 42, change “door,” to --door--;
Column 10, line 46, change “operation,” to --operation--;
Column 11, line 30, change “sayings” to --savings--; and
Claim 10, column 13, line 57, change “door:” to --door;--.

Signed and Sealed this
Second Day of October, 2012

David J. Kappos

David J. Kappos
*Director of the United States Patent and Trademark Office*